United States Patent [19]

Atencio

[11] 4,159,188

[45] Jun. 26, 1979

[54] DAM WITH REVERSIBLE HYDROELECTRIC STATION

[76] Inventor: Francisco J. G. Atencio, 3105 Diamante, Entre Rios, Argentina

[21] Appl. No.: 814,551

[22] Filed: Jul. 11, 1977

[51] Int. Cl.² .............................................. E02B 9/00
[52] U.S. Cl. ........................................ 405/78; 290/53
[58] Field of Search ...................... 61/19, 20, 63, 69 R, 61/69 A, 86, 87, 43; 290/53, 42, 43, 44; 417/234, 100; 416/85; 415/181

[56] References Cited

U.S. PATENT DOCUMENTS

| 608,203 | 8/1898 | Knobloch | 61/20 |
| 1,580,806 | 4/1926 | Borden | 61/20 |
| 1,730,578 | 10/1929 | Lawaczeck | 61/19 X |
| 2,163,102 | 6/1939 | Odill | 61/19 |
| 2,945,960 | 7/1960 | Obrist | 290/52 |

FOREIGN PATENT DOCUMENTS

| 50518 | 5/1911 | Austria | 61/19 |
| 1002693 | 2/1957 | Fed. Rep. of Germany | 61/19 |

*Primary Examiner*—Dennis L. Taylor
*Attorney, Agent, or Firm*—Emory L. Groff, Jr.

[57] ABSTRACT

A reversible hydroelectric station associated with a dam having a water passageway includes shiftable components selective displaceable to achieve alternately, either an energy generation or an energy accumulation mode. One or more rotatable hydromotive assemblies is provided each having an integral machine hall surrounding a venturi. A pair of diffusers are mounted for rectilinear displacement downstream of the main body of the dam and upstream of the rotatable hydromotive assembly, respectively. Selection of energy mode is achieved by rotating the hydromotive assembly about a vertical axis to position a selected end of its venturi adjacent the dam water passageway and by rectilinearly displacing one said diffuser away from said hydromotive assembly and the other said diffuser into juxtaposition with said hydromotive assembly.

11 Claims, 4 Drawing Figures

DAM WITH REVERSIBLE HYDROELECTRIC STATION

The present invention relates to dams having reversible hydroelectric stations intended to be employed in river watersheds for the purpose of energy generation, energy accumulation and storage. The proposed structure is intended to be employed primarily in rivers flowing in alluvial valleys and watersheds in plain territories but also may be considered for future coastal power developments.

By the instant arrangement, any single reversible hydroelectric power station is specially designed to operate in either a direct electric power generation pattern or in a reversible energy accumulation pattern and at the best possible hydraulic efficiency in either mode. The hydroelectric station includes a horizontal axis capsule-mounted generator having a motive turbine with movable bladed propellers. Such structure has not been introduced in large numbers in reversible hydroelectric projects but will become increasingly popular because of their inherent efficient technical design, good hydraulic performance, and reduced cost of parts.

Reversible hydroelectric assemblies for purposes of electric energy production, for purposes of energy accumulation, or for purposes of electric energy massive interchanges between pumped-storage systems and electric generation plants are well known in the art. The aim of such reversible hydromotive assemblies, positioned in combination with the water passages formed through the main structural bodies of the respective dams, is to provide for the conversion of the inherent gravitational energy stored in the mass of water retained in the reservoirs behind the dams, into electric energy. In the reversed mode, inherent gravitational energy can be increased by taking electric energy from other generating sources and transforming it into volumes of water pumped and stored within the reservoirs.

Studies have shown that within the next 25 years the United States must develop an energy generation potential of about one and one-half billion kilowatts. Of this amount, about 15% will be derived from pumped-storage installations capable of utilizing excess power from nuclear and thermal generation systems.

Up to the present time, hydroelectric station generating systems have been limited mainly to reversible Francis hydraulic turbines which significantly limits the application of pumped-storage to hydraulic heads ranging between 50-500 meters or more. For hydraulic heads lower than 50 meters known pumped-storage applications have not been popular because of their inherent higher costs measured in terms of dollars invested per kilowatt installed.

The reversible hydroelectric station pumped-storage facilities of today are mainly confined at high heads and designed with Francis turbines having reversible rotors. The overall efficiency of such assemblies has reached a ceiling numercial figure of about 75%. This ceiling is due to the intrinsic design complications of the reversible Francis turbine hydroelectric station technology involving very long conduits in the intake and the tailrace sections and the difficulty in adapting Francis reversible rotor turbines to perform so many different duties in the turbining mode, on the one hand and in the pumping mode, on the other hand.

The above limiting conditions are not found in the low-head reversible hydroelectric station concept wherein long water passage intakes, penstocks and tailraces are avoided and underground machine halls are unnecessary. Hydromotive turbines are propeller turbines very well suited to perform in both the generation mode or in the pumping mode with the same hydraulic efficiency.

According to one aspect of the present invention, there is provided a reversible hydroelectric assembly for either an energy interchange purpose or an energy transformation purpose. This assembly is to be fitted against the inlet of the water directing means defined through and within the main structural bodies of a dam in coincidence with the respective gated water passages inlet or outlet of the dam.

Each reversible hydromotive assembly has a water conduit incorporated into its structural body defined by a lateral wall surrounding the hydromotive machine and having a first open end. This structural body incorporates also, a machine hall which includes the necessary equipment for the operational performance of the enclosed hydromotive assembly.

A set of two diffusers are associated with the hydromotive station. The first of these is to be positioned downstream of the main body of the dam and the second is to be positioned upstream of the main body of the dam. Both diffusers are alternatively positioned in coincidence with the two respective open ends of the dam's water directing means as the hydromotive station is alternately rotated 180° about a vertical axis during transformation from one mode to the other mode.

Accordingly, it is an object of the present invention to provide an improved reversible hydroelectric station designed to operate at low-hydraulic heads, that is, at average low-hydraulic heads having a maximum range of about 35/50 meters and to yield a substantially improved energy transformation efficiency.

Another object of the present invention is to provide a reversible hydroelectric assembly which may be manufactured, assembled, tested, and stored at the factory and includes an integral machine hall whereby, it may be integrally transported as an individual module to be erected and assembled at its respective dam.

A further object of the present invention is to provide a hydroelectric assembly yielding an improved energy transformation efficiency in a pumped-storage system whereby a low-head reversible pumped storage concept becomes feasible in competitive terms with the Francis turbined high head pumped storage concept.

Still another object of the present invention is to provide a water storing dam including a capsule-type hydromotive assembly containing a dual-mode energy transformation unit and which is selectively rotatable 180° for operation in either an energy generation or energy accumulation mode.

Another object of the present invention is to provide a water storing dam having a rotatable hydromotive assembly upstream of a dam water directing passageway and cooperable alternately with two rectilinearly displaceable diffusers, one downstream of the dam main body structure and the other upstream of the hydromotive assembly.

A preferred and practical embodiment of the invention is shown in the accompanying drawings, in which.

Similar reference characters designate corresponding parts throughout the several figures of the drawings.

Figure 1:
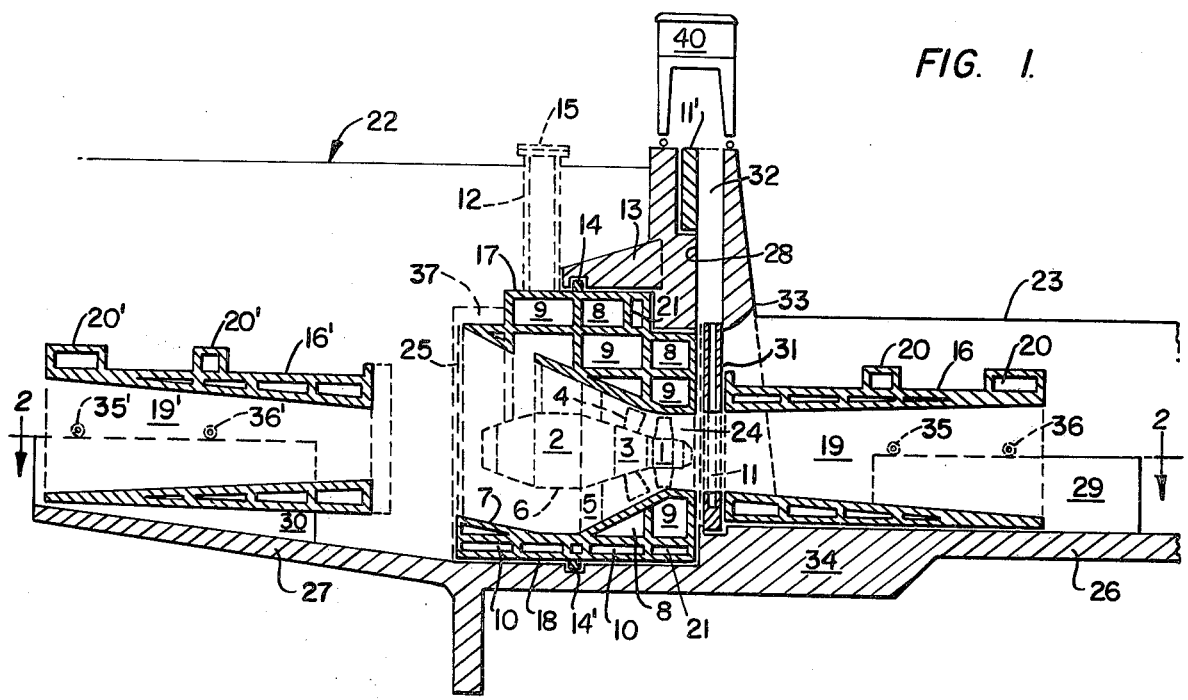
FIG. 1 is a vertical, longitudinal sectional view of a reversible hydroelectric station according to the present invention, as it appears when in an energy generation mode.

Referring now to the drawings, the reversible hydroelectric station of the present invention will be seen to include an energy transformation unit comprising the electric generator-motor 2 having a motive turbine-pump 1 at one end axially adjacent a connecting shaft body 3 provided with a movable distributor 4. Regulation of water flow passing the periphery of the capsule configuration of the turbine-pump 1 is achieved by means of the fixed distributor 5. The energy transformation unit and its turbine-pump 1 may be considered to be a unitary sub-assembly hermetically enclosed by means of the capsule 6. A substantially longitudinally extending water flow circulation path surrounds the entire generator-motor 2 and is formed by the conduit 7 which serves as a wall defining the peripheral limits of the water flow circulation path and is bounded at one end by a relatively large intake end opening and at the other end by a smaller output end opening. The surrounding structural body 17 of the hydromotive assembly is provided with a plurality of internal chambers 8, 9 and 19 serving respectively, as buoyancy compartments, chambers for machinery utilization and chambers for purposes of ballasting. Access means 12 having a cover 15 leads to the machine hall and capsule 6. The hydromotive assembly will be seen to be positioned for utilization at a point immediately upstream of the main structural body 28 of the dam while the structural body 28 in turn is suitably retained atop the underlying support slab 34 to which are appended the upstream slab 27 and downstream slab 26.

Figure 2:
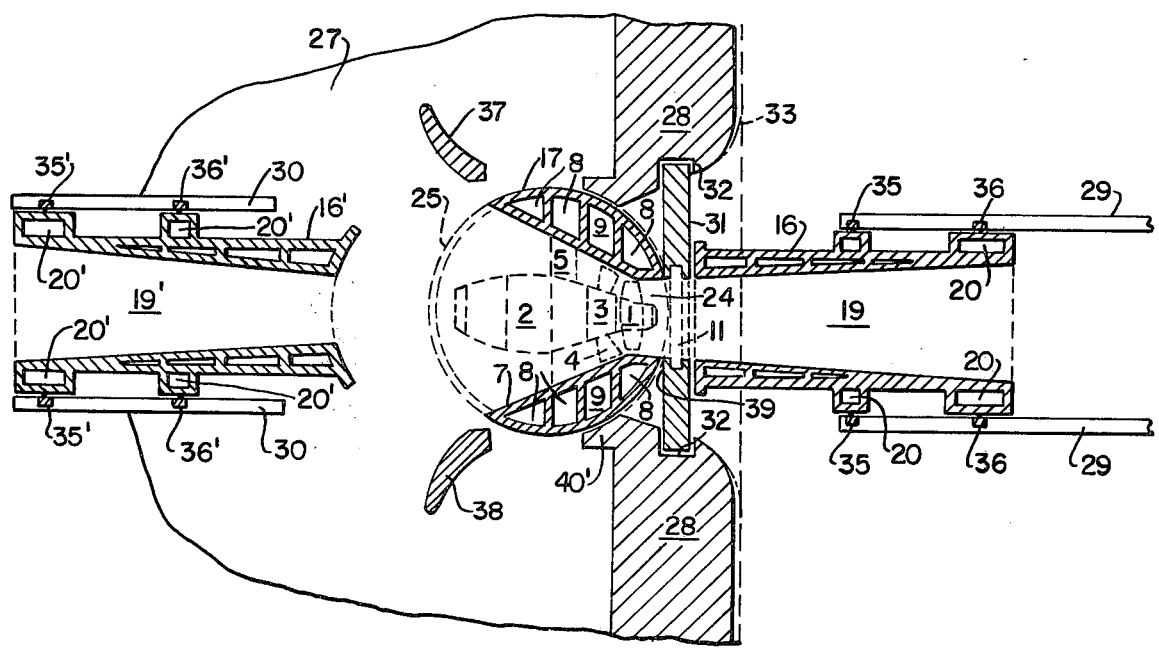
FIG. 2 is a horizontal sectional view of the structure shown in FIG. 1.
Figure 4:
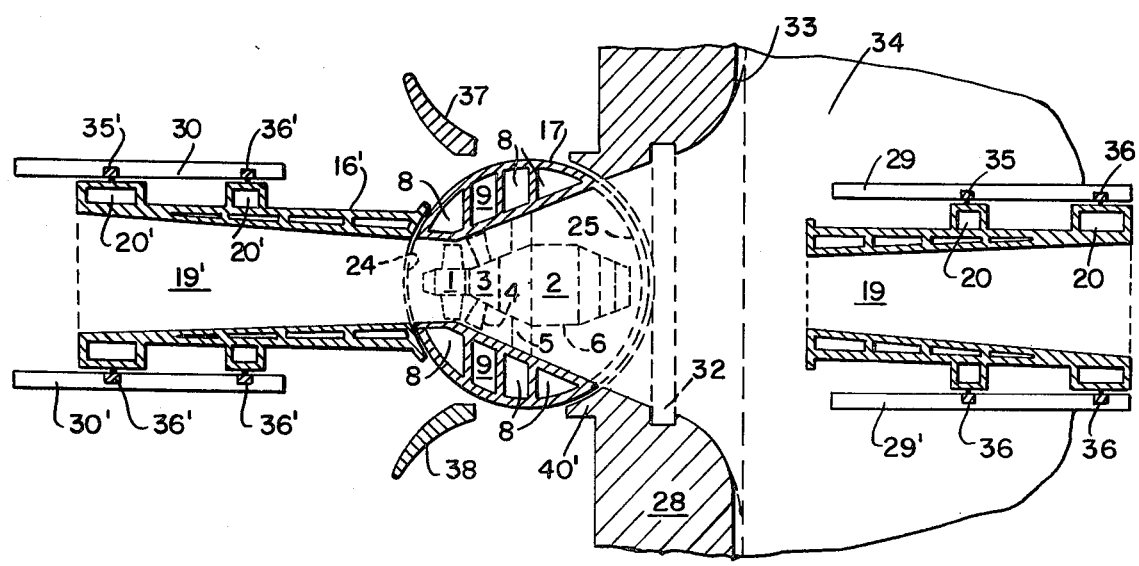
FIG. 4 is a horizontal sectional view of the structure of FIG. 3.

As seen in FIGS. 2 and 4 of the drawings, an opening 33 is provided in the main structural body 28 of the dam and serves as means for directing a flow of water therethrough. A restricted water path in this water directing means is formed by means of a shiftable main gate 31 which may be vertically disposed within the oppositely disposed slots 32 in the dam main structural body 28. This main gate 31 in turn is provided with a recess or opening 11 therethrough for the reception of a secondary or auxiliary gate 11' when it is desired to completely close off the dam water directing means.

The bottom 18 of the base of the hydromotive assembly body 17 is disposed atop the dam supporting slab 34 and is provided with suitable means permitting of a reversibility thereof such as the retractable lower retaining pin 14', while similar means such as the retractable upper retaining pin 14 will be seen to project from the upper part of the assembly body 17 and is suitably journaled within the top structural support 13. Appropriate well known means may be employed to rotate the hydromotive assembly about the vertical axis defined by the two retaining pins 14' and 14 so as to arcuately displace the entire assembly 180° between the two alternate positions shown in FIGS. 1-2 and FIGS. 3-4 of the drawings, respectively.

Cooperating with the hydromotive assembly of the present invention when used in either the energy generation or energy accumulation modes are a first or downstream diffuser 16 and a second or upstream diffuser 16'.

The first diffuser 16 includes a tapered interior wall 19 having a smaller upstream open end and a larger downstream open end and the body of the diffuser will be seen to include one or more chambers 20 for regulating buoyancy of the diffuser. The diffuser 16 is supported for use upon a pair of laterally disposed supporting walls 29—29 resting atop the downstream slab 26. These walls in turn serve as a fixed support for a plurality of rolling elements 35-36 projecting from both sides of the diffuser body. It will be understood that the supporting walls 29 are positioned to insure that the diffuser 16 carried thereby will be capable of a rectilinear displacement relative the downstream open end 33 of the dam with the longitudinal center axis of the diffuser 16 aligned with the center of the dam water directing means and the verturi formed by the water flow circulation path of the hydromotive assembly.

The second or upstream diffuser 16' likewise includes a tapered interior wall 19' having a smaller downstream open end and a larger upstream open end and additionally includes a plurality of chambers 20' for buoyancy. This diffuser 16' includes a plurality of suitable roller elements 35'-36' mounted on its opposite exterior sides for the purpose of supporting the diffuser atop a pair of laterally spaced apart supporting walls 30—30 which in turn are mounted atop the upstream slab 27. As in the case of the first downstream diffuser 16, the second upstream diffuser 16' is mounted for rectilinear movement along an axis aligned with the center of the venturi of the hydromotive assembly and the water directing means of the dam.

As previously described, FIGS. 1-2 illustrate the various components of the present invention as they appear when in the energy generation mode. With the hydromotive assembly rotated to the position shown it will be seen that the main gate 31 is lowered so as to present the smaller water directing path defined by the opening 11 therein. Surrounding this opening are the structural extensions 39 serving to promote a good seal between the dam water conveying means at this point and the juxtaposed downstream open end 24 of the hydromotive assembly conduit. Additionally, sealing is achieved by means of the structural wall extensions 40' projecting upstream from the main structural body 28 of the dam and arranged to form a close sealing fit with the periphery of the hydromotive assembly body 17. When thus positioned, the other larger open end 25 of the hydromotive assembly is facing upstream and is laterally bounded by the two extension walls 37—37 which are suitably contoured on their upstream faces to assist and direct incoming water flow into the enlarged upstream end 25 of the water flow circulation path through the interior of the hydromotive assembly.

The system is finally readied for the energy generation mode by the selective rectilinear displacement of the first diffuser 16 and second diffuser 16' into the positions shown in FIGS. 1-2 of the drawings wherein it will be seen that the upstream end of the downstream diffuser 16 is moved juxtaposition the water directing means formed by the opening 11 in the main gate 31 while the downstream end of the upstream diffuser 16' is moved away from the upstream open end 25 of the hydromotive assembly.

In a normal installation the upstream water level 22 and downstream water level 23 may appear as illustrated in FIG. 1 of the drawings and accordingly it will be understood that the resultant water head will produce a flow of water into the upstream open end 25 of the hydromotive assembly, through the water flow circulation path defined by the interior peripheral wall 7 thereof, thence through the restricted downstream open end 24 of the hydromotive assembly before passing through the gate water directing means 11 and through the first downstream diffuser 16. Concurrently with the above described water flow path the turbine 1 of the energy transformation unit 2 wil be actuated to operate the generator thereof.

Figure 3:
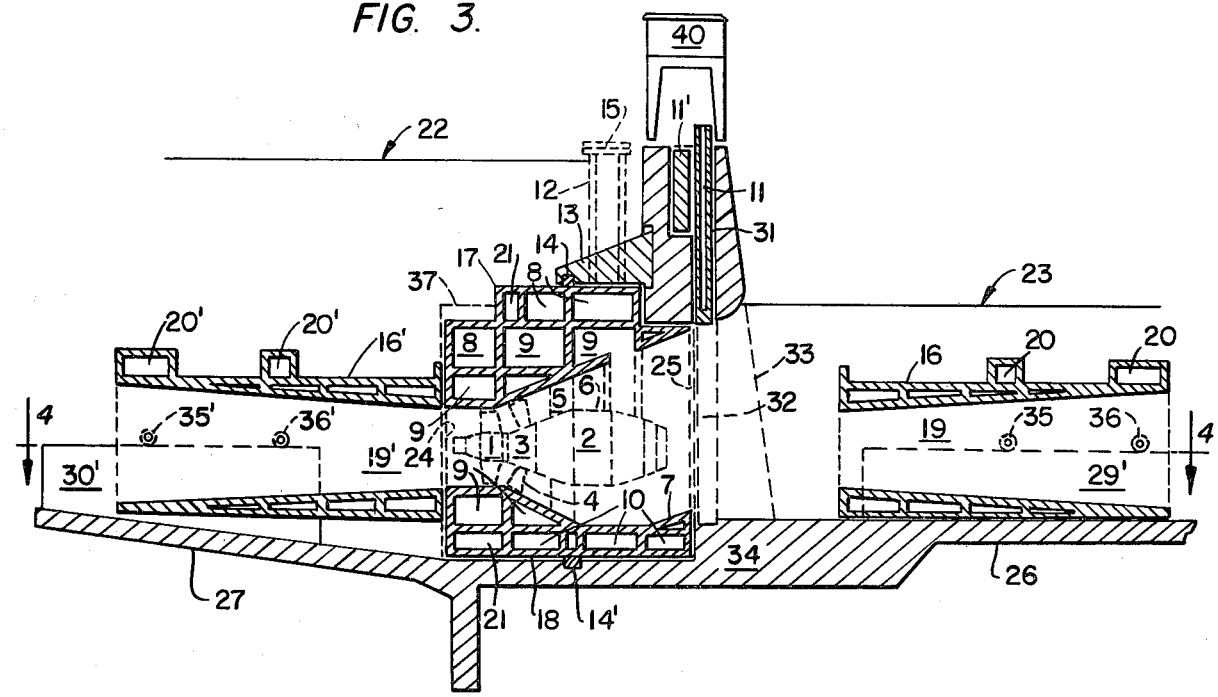
FIG. 3 is a vertical, longitudinal sectional view of the structure of FIG. 1 as it appears when positioned in the pumping or energy accumulation mode.

When reversing the hydromotive assembly 17 from the energy generation to the energy accumulation mode, the various components of the system are shifted to the relative positions shown in FIGS. 3-4 of the drawings. The foregoing is accomplished by rotating the hydromotive assembly body 17 180° about the vertical axis defined by the members 14-14' until the larger open end 25 is disposed in a downstream direction juxtaposed the upstream side of the dam water directing means which in this case will be defined by the open end 33 of the dam main structural body, it being understood that the main gate 31 has been elevated such as by the overhead crane 40 to produce a larger area to the water directing means. The first downstream diffuser 16 is rectilinearly displaced in a downstream direction away from the main structural body 28 of the dam while the second upstream diffuser 16' is rectilinearly displaced in a downstream direction to position its smaller end opening juxtaposed the smaller opening 24 of the hydromotive assembly. With the foregoing achieved, energy accumulation or a direct pumping mode takes place as excess energy from another source is supplied to the energy transformation unit 2 to operate the motor therein which in turn activates the pump 1 to return water from downstream of the dam through the hydromotive assembly water flow circulation path, thence through the second upstream diffuser 16' and into the body of water behind the dam.

Auxiliary jacking arrangements and crane facilities (not shown) may also be provided for accomplishing the reversing or rotatable displacement of the hydromotive assembly about the axis defined by the retractable pins 14-14'.

Additionally, recesses 21 formed in the bottom of the hydromotive assembly body 17 permit placement of jacking mechanisms for the purpose of linearly moving the assembly away from the main structural body 28 of the dam. With the foregoing in mind, the advantage of the retractable pins 14-14' will become more obvious since this allows lateral displacement of the hydromotive assembly from the position shown in the drawings after which floatation chambers 8 may be filled with air in order to readily remove the hydromotive assembly for reinstallation at another dam opening or for allowing replacement by another hydromotive assembly.

From the foregoing it will be seen that an improved hydroelectric station is provided comprising a symmetrical arrangement including a 180° reversible hydromotive assembly alternately cooperating with two rectilinearly displaceable diffusers to realize a maximum hydraulic efficiency in either a direct generation mode or a direct pumping mode.

I claim:

1. In a water storing dam including a main structural body having means for directing a flow of water therethrough; the improvement comprising, one or more hydromotive assemblies positioned against said main structural body, each said hydromotive assembly including a conduit having a peripheral wall defining a water flow circulation path, an energy transformation unit disposed within said water flow circulation path within said conduit, said unit adapted to activate water within said flow path or to be actuated thereby, said assembly conduit having a first open end and a second open end for discharging water entering said first open end, both said first and second open ends configured to be alternatively positioned against an open end of said dam water directing means, and means on said hydromotive assembly mounting same upon said main structural body of said dam to allow rotatable displacement of said hydromotive assembly between said alternate positions.

2. A water storing dam according to claim 1 wherein, one said open end of said hydromotive assembly conduit is disposed downstream in coincidence against said dam water directing means to allow said energy transformation unit to perform in an energy generation mode while said same open end of said conduit is displaced in an upstream position to permit said energy transformation unit to perform in the energy accumulation mode.

3. A water storing dam according to claim 1 wherein, said hydromotive assembly includes means controllably influencing the energetic power output when causing actuation of said energy transformation unit and, alternatively, the energetic power input when said energy transformation unit receives actuation.

4. A water storing dam according to claim 1 wherein, said energy transformation unit includes a motor-generator connected to a runner performing as a pump when receiving actuation thereto from the motor or, alternatively, performing as a turbine driving said generator when said runner is actuated by a flow of water through said conduit.

5. A water storing dam according to claim 1 including, a diffuser mounted for rectilinear displacement along an axis passing through said dam water directing means whereby, following positioning of one said hydromotive assembly open ends against said water directing means said diffuser may be displaced toward said dam main structural body to provide a smooth continuous water flow path through said diffuser, hydromotive assembly and dam water directing means.

6. A water storing dam according to claim 5 wherein, said diffuser is disposed downstream of said dam main structural body and is rectilinearly displaced in an upstream direction into abutment with said dam water directing means when said hydromotive assembly is rotated and positioned against the upstream side of said dam water directing means when both said hydromotive assembly and said diffuser are performing in the energy generation mode.

7. A water storing dam according to claim 5 wherein, said diffuser is disposed upstream of both said dam main structural body and said hydromotive assembly and is rectilinearly displaced in a downstream direction into engagement with the upstream one of said hydromotive assembly open ends when said hydromotive assembly is rotated and the other of its said open ends engages said dam water directing means when both said diffuser and hydromotive assembly are performing in the energy accumulation mode.

8. A water storing dam according to claim 1 including, two diffusers mounted for rectilinear displacement along an axis passing through said dam water directing means, a first one of said diffusers located downstream of said dam water directing means and the second of said diffusers located upstream of said hydromotive assembly and said dam directing means, whereby, following positioning of one said hydromotive assembly open ends against said dam water directing means a selected one of said two diffusers may be displaced toward said dam main structural body to provide a smooth continuous water flow path through said selected diffuser, hydromotive assembly and dam water directing means.

9. A water storing dam according to claim 8 wherein, the upstream end of said first diffuser is rectilinearly displaced in an upstream direction into abutment with said dam water directing means when said hydromotive assembly is rotated and positioned against the upstream side of said dam water directing means when both said hydromotive assembly and said first diffuser are performing in the energy generation mode, and second diffuser is rectilinearly displaced away from said dam main structural body in an upstream direction with its downstream end spaced away from said hydromotive assembly.

10. A water storing dam according to claim 8 wherein, the downstream end of said second diffuser is rectilinearly displaced in a downstream direction into abutment with one of said open ends of said hydromotive assembly when said hydromotive assembly is rotated and positioned with its other said open end against the upstream side of said dam water directing means when both said hyromotive assembly and said second diffuser are performing in the energy accumulation mode, and said first diffuser is rectilinearly displaced away from said dam water directing means in a downstream direction with its upstream end spaced away from said dam water directing means.

11. A water storing dam according to claim 1 including, means within the body of said hydromotive assembly permitting of substantially vertical displacement thereof within the body of dam water, said vertical displacement means including at least one chamber disposed within the body of said hydromotive assembly and of a volume at least sufficient to cause floatation or sinking of said assembly when filled with gas or liquid, respectively.

* * * * *

UNITED STATES PATENT AND TRADEMARK OFFICE
CERTIFICATE OF CORRECTION

PATENT NO. : 4,159,188

DATED : June 26, 1979

INVENTOR(S) : Francisco J. Gutierrez Atencio

It is certified that error appears in the above-identified patent and that said Letters Patent are hereby corrected as shown below:

Col. 1, line 11, "future coastal power" should read -- future tidal coastal power --.

Col. 3, line 18, "means of the fixed distributor 5" should read -- means of the movable distributor 4 --.

Col. 3, line 29, "internal chambers 8, 9 and 19" should read -- internal chambers 8, 9 and 10 --.

Col. 4, line 7, "walls 29-29 should read -- walls 29-29' --.

Col. 4, line 16, "verturi formed" should read -- venturi formed --.

Col. 4, line 25, "walls 30-30" should read -- walls 30-30' --.

Col. 4, line 49, "walls 37-37" should read -- walls 37-38 --.

UNITED STATES PATENT AND TRADEMARK OFFICE
CERTIFICATE OF CORRECTION

PATENT NO. : 4,159,188

DATED : June 26, 1979

INVENTOR(S) : Francisco J. Gutierrez Atencio

It is certified that error appears in the above—identified patent and that said Letters Patent is hereby corrected as shown below:

Cancel Figure 4 of the drawings and substitute the Figure shown below.

FIG. 4.

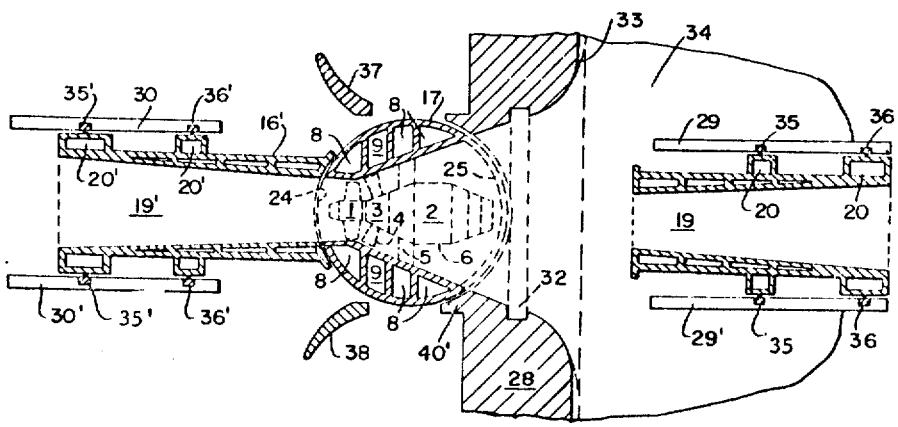

Signed and Sealed this

Eighteenth Day of May 1982

[SEAL]

Attest:

*Attesting Officer*

GERALD J. MOSSINGHOFF

*Commissioner of Patents and Trademarks*